United States Patent Office 3,554,949
Patented Jan. 12, 1971

3,554,949
WAX FORMULATIONS
Oliver W. Burke, Jr., 506 Intracoastal Drive,
Fort Lauderdale, Fla. 33304
No Drawing. This application is a continuation of Ser. No. 447,977, filed Apr. 14, 1965, which in turn is a continuation-in-part of Ser. No. 29,595, filed May 17, 1960, now abandoned, which in turn is a continuation-in-part of Ser. No. 538,728, filed Oct. 5, 1955, and Ser. No. 462,611, filed Oct. 15, 1954, and patented June 22, 1965, Patent No. 3,190,850, which in turn is a continuation-in-part of Ser. No. 378,735, filed Sept. 8, 1953, now abandoned, which was a continuation-in-part of Ser. No. 795,881, filed Feb. 20, 1959, now abandoned, which in turn replaced by Ser. No. 416,585, filed Dec. 7, 1964. This application Nov. 16, 1966, Ser. No. 594,944
Int. Cl. C08f 45/52; C09g 1/10; C09d 5/02
U.S. Cl. 260—28.5
5 Claims

ABSTRACT OF THE DISCLOSURE

Meltable soluble waxes 99 to 22% are combined with 1 to 78% of rigid, non-meltable, non-soluble cross-linked, colloidal-sized, vinylic filler particles by weight, to produce improved compositions having wax-like properties. Similar improvements are effected by adding 1 to 78% of the rigid, non-meltable vinylic filler particles to meltable wax-resin compositions of which the wax content is at least 5% and of which the resin is a meltable, soluble resin.

---

This application is a continuation of Ser. No. 447,977, filed Apr. 14, 1965 which is in turn a continuation-in-part of my copending U.S. patent application Ser. No. 29,595 filed May 17, 1960, now abandoned, (Case 33) in turn a continuation-in-part of application Ser. Nos. 538,728, filed Oct. 5, 1955, now abandoned, (Case 5) and 462,611 filed Oct. 15, 1954 and allowed Oct. 23, 1964, patented June 22, 1965, Pat. No. 3,190,850 (Case 6), which copending applications were in turn continuations in part of my application Ser. No. 378,735, filed Sept. 8, 1953, now abandoned, (Case 4) which was replaced by a continuation in part application Ser. No. 795,881 filed Feb. 20, 1959, now abandoned, in turn replaced by copending application Ser. No. 416,585 filed Dec. 7, 1964. With respect to continuing subject matter, reference may also be made to the subsequently issued corresponding foreign patents, e.g. (Case 4) British Pat. No. 799,043 and French Pat. No. 1,144,575, the disclosure of which corresponds to that of my parent application Ser. No. 378,735; (Case 5) Union of South Africa Pat. No. 3,714/56 and French Pat. No. 1,163,886 the disclosure of which corresponds with that of my parent application Ser. No. 538,728; (Case 6) Canadian Pat. No. 581,823 and French Pat. No. 1,135,-872, the disclosure of which corresponds with that of my parent application Ser. No. 462,611.

This invention relates to wax composition and processes for producing same and aims generally to improve the same.

For convenience of reference the present specification is provided with head notes and catch-lines, but such are not to be taken as restricting the scope of the invention herein disclosed and claimed.

STATE OF THE ART

It is known that the hardness and gloss of natural and synthetic waxes may be improved to a degree by combining therewith various types of natural resins. For example, beeswax, carnauba wax, Japan wax, ozokerite, paraffin waxe and the like have been combined with natural resins such as Batavia or Singapore damar resins, East India resins, elemi, Batu resin, Manila resins, Congo resins, Kauri resin and the like. By proper selection of these natural resins and the wax mixtures such may be combined by melting at temperatures from 90° to 325° C. and the melting point of the combinations is usually in the range of 50° to 130° C.; or such resin-wax combinations may be prepared as aqueous dispersions.

OBJECTS AND ESSENCE OF INVENTION

A principal object of the present invention is to produce further and different new and useful wax or wax-resin compositions. By the present invention such compositions are obtained by dispersing in the meltable, soluble waxes or wax-resin compositions colloidal sized, non-fusible (i.e. non-meltable) organic particles, namely colloidal sized, gelled, i.e. three-dimensionally cross-linked, synthetic polymer particles generically termed vinylic filler materials and hereinafter more fully defined, which cross-linked particles are non-soluble as well as non-fusible, and such new and useful dispersions may be embodied in solid, or pastry, or organic solvent dispersed, or aqueously dispersed, forms within the broader aspects of the invention. The new dispersions can be employed in formulating various types of finishes, coatings, and polishes, which in turn may be adapted for furniture polishes, floor polishes, metal polishes, automobile polishes, textile and leather finishes, paper finishes, and other finishes in which waxes are employed, such as cosmetics, and as aerosol sprays for such uses.

The vinylic filler materials can impart improved physical properties e.g., hardness, gloss, and resistance to abrasion when appropriately blended with waxes and wax-resin compositions. I have found that the vinylic fillers because of their insolubility, colloidal size and rigidity can increase hardness and strength of waxes and wax containing compositions without deleteriously altering other physical properties thereof. Thus among the advantages, the vinylic filler has a reinforcing effect on the wax, and this coaction enables a lower melting wax, when reinforced and hardened by vinylic filler, to act effectively like a hard or higher melting wax in its resistance to displacement from surfaces to which it is applied. Also the insoluble, non-meltable, rigid vinylic filler particles are not deformed by pressure or scuffing and thus coact to reinforce and enhance the wax film.

Other objects and advantages of this invention will be made apparent by the following general description and illustrative examples.

The invention resides in the novel products and methods for producing such herein disclosed as more particularly pointed out in the claims.

MODES OF FORMING THE NEW DISPERSIONS

In accordance with the present invention the non-meltable, non-soluble vinylic filler material, hereinafter more fully defined, may be dispersed in the meltable, soluble wax or wax-resin compositions in any suitable way, e.g. by (a) dispersing the non-meltable vinylic filler in the molten wax or wax-resin mixture, or vice versa, (b) dispersing the non-soluble vinylic filler in an organic solvent solution of the wax or wax-resin composition, or vice versa. (c) or mixing an aqueous dispersion of the colloidal sized non-meltable, non-soluble vinylic filler with an aqueous dispersion of the meltable, soluble wax or wax-resin composition. Further, as alternatives to procedure (c) an aqueous dispersion may be prepared (d) by aqueously dispersing the compositions produced by procedures (a) or (b), either in the absence of, or preferably in the presence of, an organic solvent for the wax or wax-resin components thereof; or (e) by dispersing the wax or wax-resin composition, with or without organic solvent, in an aqueous dispersion of the colloidal sized vinylic filler particles.

It is to be appreciated that in forming a vinylic filler/wax/resin composition by any of procedures (a) through (e) the vinylic filler may be first combined with one of the components of the wax-resin composition, and that such subcombination may thereafter be combined with the other component or components thereof.

Finally, in certain instances the vinylic filler may be combined with wax or wax-resin composition by mechanical working without wax melting or the use of solvent as aforesaid, but this procedure is not preferred. The compositions obtained by any of the above procedures may be further formulated as finishes as aforesaid by adding other ingredients, as exemplified hereinafter.

The dispersion of the infusible and insoluble vinylic filler material in the melted wax or wax-resin composition may be accomplished by either employing the vinylic filler in dry from or as a wet filter cake or as an aqueous dispersion and when water is present then the temperature is maintained above the melting point of the wax or wax-resin mixture during the combination thereof with the vinylic filler and the water is thereafter removed.

DEFINITIONS

By the term "wax" or "waxes" as used herein is meant any one or more of the unctuous, fusible (i.e. meltable), viscous liquids to solid substances, having a characteristic waxy luster, of natural or synthetic origin or derived from natural or synthetic materials. Such waxes include (a) those of animal origin, such as lanolin, spermaceti, beeswax, stearic acid. Chinese insect wax, shellac wax, and the like; (b) the mineral waxes such as ozokerite, Montan, Utah, paraffin, ceresin, microcrystalline, petrolatum and etc. (c) the vegetable waxes, e.g., carnauba, quericury, palm, raffia, cocoa, candelilla, rhimba, ocoxilla, banana, esparto, flax, hemp, cottonseed, kapok, sugar cane, banaboo leaf, bayberry, ucuhuba, japan, cocoa butter, fiber, reed, ocuba, godang and blanophore waxes and the like; (d) the artificial waxes including those obtained from the distillation of paraffin base petroleum, ozokerite, and from the destruction distillation of lignite and paraffinaceous shales, e.g. peat wax and the like; (e) the synthetic and manufactured waxes which include the fatty alcohols, e.g. cetyl alcohol, stearyl alcohol and other alcohols derived from fatty acids and the like; esters of higher-atom alcohols and fatty acids including esters of cetyl, stearyl alcohol and the like with stearic palmitic acid and the like; and fatty acids including stearic, palmitic, myristic, and fatty acids from tallow, cottonseed, coconut and soyo bean oils; the glycerol esters such as glycerol tri-stearate, glycerol distearate and glycerol monostearate and the like; the mono- and di-fatty acids esters of glycols such as ethylene glycol mono- and di-stearate, diethylene glycol mono- and di-palmitate, propylene glycol mono- and di-stearate, the sorbitol stearates, the pentaerythritol stearates, the polypentaerythritol fatty acid esters and the like; the hydrogenated and partially hydrogenated fatty oils such as cottonseed, coconut, peanut, soya bean, castor, fish, whale and other vegetable and/or animal oils and the like; the polyglycols usually having a molecular weight greater than 500 (e.g. the Carbowaxes of Carbide and Carbon Chemical Corp.) and the like; the chlorinated naphthalenes (e.g. the Halowaxes and the Seekay waxes) and the like; complex nitrogen derivates of higher fatty acids (e.g. the Acrawaxes) and the like; glycerine and glycol esters of acids derived from Montan wax (e.g. the I. G. waxes) and the like; waxy ketones, amines, amides and nitriles such as 16-hentriacontanone, octadecyl-hexadecyl amine, higher molecular weight aliphatic amides (e.g. "CD" amides of Armour & Co.), octadecanamide, hexadecanamide, octadecane nitrile, hexadecane nitrile and the like; solid hydrocarbons with melting points up to 210° C. (e.g. the Santowaxes of Monsanto Chemical Co., polyethylene wax, and wax-like polymerization products of one or more α-olefins) and the like; the oxidized paraffin or microcrystalline waxes (e.g. the Petrolite Waxes of the Petrolite Corp. Ltd., New York, N.Y.); air blown petroleum asphalts, air blown gilsonite and other air blown petroleum products of a waxy nature and the like and the term waxes includes compatible combinations of these various waxes set forth under (a) thru (e) above and it has been found according to this invention that these waxes and their combinations can be combined with vinylic fillers and vinylic pigments to yield new and improved wax like products.

By the term "resins" as used herein I mean resins compatable with one or more of the waxes included under the definition of "waxes" heretofore and included among such resins are polymers which are resinous themselves or are converted to resins by chemical treatment and such resins include those derived from natural rubber and homopolymers of dienes, e.g., the resins derived from polybutadiene, polyisoprene, polypiperylene including those that are partially or completely chlorinated or hydrochlorinated or hydrogenated (e.g. the trademarked product "Pliolite" of the Goodyear Tire and Rubber Co.) and the like; the resinous graft polymers of such elastomers grafted with vinyl, vinylidene and vinylene monomers; and the resinous copolymers of conjugated dienes and vinyl, vinylidene and vinylene monomers; the resinous olefine polymers compatable with waxes include polyethylene, crystalline polypropylene, and other resinous α-olefin polymers, including α-olefin-vinyl or-vinylidene or-vinylene copolymers; the vinyl and vinylidene polymers and copolymers such as the methacrylate polymers e.g. butyl methacrylate and isobutyl methacrylate polymers; the silicone polymers and the like; further included are the resinous metal soaps of fatty acids e.g. aluminum stearate and the like; cellulose derivatives such as ethylcellulose and the like; cumarone-indene resins; phenol-modified resins; amine-aldehyde resins; alkyd resins e.g. glycerolphthalate resins and the like; the natural resins including Batavia and Singapore damar, Batu, East India, Congo, elemi, Kauri, Manila, Manila Loba, Boea, Macassar resins and rosin and the like; chemically modified natural resins such as esterified rosin, copal, pontiniak, Manila, Kauri damar, Congo resin and the like; acetylated damar and the like; butyrocopal and the like; chlorinated manila resin and the like; for further examples of the resins compatable with waxes see H. Bennett's book entitled, "Commercial Waxes—Natural and Synthetic" first published in 1944 by Chemical Publishing Co., Brooklyn, N.Y. and C. L. Mantell, C. W. Kopf, J. L. Curtis and E. M. Rogers book entitled, "The Technology of Natural Resins" first published in 1942 by John Wiley and Sons, New York, N.Y. and especially in this latter work table CXXVII, page 433, gives a table of data on the melting point of various Resin-Wax Mixtures which combinations I have found are most suitable for combinations with vinylic fillers and vinylic pigments according to the teachings of this invention. It is to be appreciated that the "resins" contemplated herein, listed just above, and typified hereinafter, are selected from the class consisting of (I) the natural resins referred to above as having been used heretofore to form wax-resin compositions, and (II) the similarly resinous materials of synthetic origin referred to above, namely, (a) the specified resinous materials derived from natural and synthetic elastomers (but not the elastomers themselves) and (b) the specified resinous polymers (which do not include elastomeric polymers); and the accordingly the term "resin," as used herein with respect to the resin component of a wax-resin composition, based on the aforesaid exemplifying disclosures of the present specification, is correspondingly limited to "resinous" as distinguished from "rubbery" materials, and therefore is not to be considered as embracing natural rubber or synthetic elastomers which are not disclosed herein as components of wax-resin compositions.

By the term "wax-resin composition" is meant any compatible combinations of one or more of the waxes as heretofore defined with one or more of the resins heretofore defined provided the wax content is at least 5% by weight of such wax-resin composition.

Further, the term "wax composition" as used herein is a generic term which includes the waxes and the wax-resin compositions as above defined.

The term "vinylic filler" is used herein in its generic sense and thus includes the non-grafted and grafted vinylic fillers and vinylic pigments disclosed in the aforesaid parent applications and foreign patents corresponding thereto, i.e., this term comprises generally the non-fusible, non-soluble organic filler materials in the form of colloidal sized particles of from about .015 to about 0.5 micron average diameter which are disclosed therein and exemplified herein, including the homopolymerization and multipolymerization products from one or more monomers in the form of such colloidal sized particles which are obtainable by polymerization in aqueous dispersions, of polymerizable monomer substances containing one or more polymerizable unsaturated linkages, including monomers having vinylidene, vinyl, vinylene or allyl groups or combinations of these groups such as polyvinylidene, polyvinyl, polyallyl-, vinyl-allyl, vinylidene-allyl, vinyl-vinylidene monomers or other polymerizable unsaturated compounds providing the polymer products therefrom are tridimensionally cross-linked within the particles so that they are non-fusible (i.e. non-meltable) and non-soluble in solvents for non-cross-linked polymer material, or providing at least one or more of the polymerization steps in the formation of the interpolymer particles hereof is a cross-linking polymerization step rendering the particles non-soluble and non-fusible and including such vinylic fillers which may contain residual unsaturation or which may have been chemically treated to introduce reactive or polar groups and thus vinylic fillers include those which comprise polar or reactive surface atoms and groups, for example, oxygen, nitrogen, sulfur or selenium, tellurium, or the halogens and these atoms being especially in the form of amine, hydroxyl, mercaptan, acyl, carboxyl, thiocarboxyl, esterified carboxyl, esterified thiocarboxyl, etherified hydroxyl, or corresponding thioether, polysulfide, sulphone, sulphonic, nitro, nitrile, isonitrile, cyanate, isocyanate groups; and those which are, or are not separately surfaced with polar organic materials can, nevertheless including amine, alcohol, phenol, acid, ester, acetal, nitro-compound, nitrile, isonitrile, mercaptan, thiophenol, polysulfide, thioether, sulphone and sulphonic acid groups derivable from the monomers employed to prepare such and the term vinylic filler also includes, as a multi-polymerization product, the interpolymer type and vinylic filler include those vinylic fillers described in British Pat. No. 799,043 and French Pat. No. 1,144,575.

By the term "interpolymer" is meant the polymerization product produced when two or more monomers are polymerized sequentially or one or more monomers are polymerized in the presence of a polymer or when a condensation polymer is formed in the presence of a polymer. When the components of an interpolymer are inseparable from one another because the component polymers are chemically bonded to one another then the newly created polymer is referred to as a "grafted polymer." (See T. Alfrey Jr., J. Bohrer and H. Mark's book entitled "Copolymerization" published in 1952 by Interscience Publishers, Inc., New York, especially Chapter VIII.)

By the term "graft vinylic fillers" is meant an interpolymer vinylic filler that is a vinylic filler prepared by two or more polymerization steps, i.e. this term is used in the same sense as in U.S. patent Application No. 538,728 and French Pat. No. 1,163,886.

By the term "vinylic pigment" or "vinylic filler pigment" is meant pigment material consisting essentially of vinylic fillers and/or graft vinylic fillers having on their particle surfaces at least one coloring component as hereafter defined; and said non-graft and graft-vinylic fillers consist of individual particles in the average size range of about 15 millimicrons to about 0.5 micron diameter, which individual particles are themselves non-soluble in organic solvents and have been prepared by cross-linking polymerization in aqueous dispersion of at least one monomer material selected from the class consisting of group (A) cross-linking monomers containing a plurality of polymerizable $>C=C<$ groups and group (B) monomers containing a single polymerizable $>C=C<$ group, said selected monomer material comprising at least one monomer selected from the group (A) and said particles being cross-linked thereby to the said non-soluble form; and said coloring component being selected from the class consisting of metals, metal compounds, inorganic and organic colors and color components, and combination of any thereof, and in this respect the term vinylic pigment is used in the same sense as in French Pat. No. 1,135,872 and Canadian Pat. No. 581,823.

Thus the term "vinylic-filler material" includes vinylic fillers, graft vinylic fillers, and vinylic filler pigments, all of which comprise vinylic filler material, said vinylic filler material being made up essentially of polymer particles in the colloidal size range of about 5 millimicrons to about 0.5 micron average diameter; said particles being three-dimensionally cross-linked so that each particle is non-meltable and non-soluble in any solvent that does not break down its primary chain structure, i.e. that does not chemically decompose it; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid.

PROPORTIONS AND TYPICAL WAX-RESINS

The proportion of vinylic filler to wax composition in accordance with this invention is confined to materials in which the wax composition forms the continuum and comprises as non-continuum from 1 to about 72% by weight of vinylic filler as above defined, substantially uniformly dispersed throughout said continuum. Typical of the wax-resin combinations which may be employed as the wax composition are the following: paraffin-ceresin-resin; wax-rosin; cumarone-indene resins-wax, carnauba-rosin-paraffin, polymethacrylate-rosin-beeswax, damar-wax, ethylcellulose-montan wax, paraffin-carnauba-beeswax, candelilla-carnauba-beeswax, candelilla-carnauba-chinese wax, paraffin-montan wax, ozokerite, candelilla-chinese wax-beeswax and the like.

The properties, including compatabilities of the many waxes of commerce with other waxes, resins, oils, and solvents are given by H. Bennett in his book entitled, "Commercial Waxes," as an aid to formulation for use. Such formulations when combined appropriately with my vinylic fillers and pigments of the several types outlined herein, show improved properties which extend the usefulness of such formulations.

Vinylic filler-wax compositions such as polishes, e.g., floor polishes, car and furniture polishes may be formulated to contain just sufficient wax and resin constituents to bond the vinylic filler particles, i.e., in slight excess of the amount required to fill the free space or interstices of the dry mass of vinylic filler particles, e.g. 22 to 30% by weight of the composition. Such a polish leaves a dry hard film that "wears" much longer than the same polish prepared without the vinylic filler.

Thus vinylic fillers and/or graft vinylic fillers and/or vinylic pigments are employed in amounts of 1% to 78% by weight and preferably 5% to 50% by weight of combination thereof with wax or with a wax-resin composition.

DETAILED DESCRIPTION

(1) Blend Forming

For ease of reference in the following examples, the methods or procedures contemplated by the present invention for combining the vinylic fillers as non-continua into the wax compositions as continua may be classified as follows:

(I) Blending vinylic fillers into waxes or wax-resin mixture (a) By incorporating latices or water dispersions of non-grafted vinylic fillers, grafted vinylic fillers and/or vinylic pigments into the waxes, wax-resin or other wax compositions. The wax or wax composition is preferably melted or cut with a solvent and with or without the aid of a dispersing agent the vinylic filler latex is worked into such wax or wax composition by stirring, agitating, or other mechanical methods, the water being retained or removed as desired.

(b) By incorporating dispersible wet or essentially dry non-grafted vinylic fillers, grafted vinylic fillers and vinylic pigments into waxes, wax-resin or other wax compositions. The dispersible vinylic filler can be milled or mechanically worked into the wax or wax composition with or without melting the latter, or with or without solvent cutting thereof. When wet vinylic fillers are employed it is desirable to dry the resultant filler wax composition above 100° C. at atmospheric pressure, or below 100° C. at reduced pressures.

(c) By incorporating the latex of vinylic fillers and/or vinylic filler pigments into a wax emulsion or a wax-resin emulsion. Many types of wax emulsions have been developed for commercial use (see Wax Formularly, pps. 396–563, of H. Bennett's book on "Commercial Waxes," hereinbefore cited, and also see "Emulsions and Detergents," ninth edition, published by Carbide and Carbon Chemicals Co., 1955 (example of a viscous wax emulsion is as follows (in parts by weight):

| | Wax | Amine | Stearic acid | Water |
|---|---|---|---|---|
| Example: | | | | |
| 1 | Paraffin wax (88) | Triethanolamine (3.5) | 9 | 300 |
| 2 | Petrolatum (88) | do | 9 | 100 |
| 3 | Carnauba wax (87) | Triethanolamine (4.9) | 9 | 400 |

In these formulations monoethanolamine, morpholine, mixed isopropanolamine, and the like can be substituted for the triethanolamine or an equivalent weight basis. When such substitution is made the amount of fatty acid may be decreased without loss of emulsion stability. Other fatty acids may be substituted for the stearic acid. When oleic acid is employed larger amounts of wax can be employed without becoming excessively viscous for use. Examples of low viscosity wax-resin emulsions are follows, the parenthetic values being parts by weight:

| | Waxes | Amine | Fatty acid | Water |
|---|---|---|---|---|
| Example: | | | | |
| 4 | Paraffin (45) plus Carnauba (3) | Triethanolamine (6.0) | Stearic (9) | 225 |
| 5 | Paraffin (40) plus Carnauba (4) | Monoethanolamine (2.6) | Oleic (9.0) | 225 |
| 6 | Paraffin (45) plus Beeswax (3) | Morpholine (3.7) | Stearic (13.5) | 225 |
| 7 | Paraffin (40) plus Casein (5) | do | do | 225 |
| 8 | Japan wax (15) | Triethanolamine (1.5) | Oleic (3.0) | 100 |

By blending the vinylic filler latices with wax emulsion prepared or adjusted to the same pH, stable emulsions are prepared; occasionally water may be added to attain the desired viscosity of the emulsion. The vinyl-filler-wax emulsion combination may find application per se or it may be dried to evaporate the water and leave a solid filled wax composition for many applications.

(II) Blending waxes or wax-resin mixtures into vinylic fillers (a) By incorporating the wax or wax composition into latices or water dispersions of non-grafted vinylic fillers, grafted vinylic fillers, or vinylic pigments.

To the vinylic filler latices with or without the addition of dispersants and/or emulsifiers and if necessary under heat and pressure are added waxes or wax-resin compositions which also may or may not contain added dispersants or emulsifiers. The wax or wax composition is preferably melted or cut with a solvent to facilitate its incorporation into the vinylic filler latex, and water of the latex may be retained or removed as desired.

(b) By mechanically mixing dry waxes or wax-resin composition into dry vinylic fillers in any suitable way, e.g., by ball milling, roller milling, grinding, or the like. Incorporation of such waxes or wax-resin compositions with the vinylic fillers or vinylic pigment powders can be facilitated by raising the temperature to the melting point of the waxes or by solvent cutting the waxes before or during the step of mechanical incorporation.

(c) By incorporating a wax emulsion or wax-resin emulsion with a vinylic filler latex and/or vinylic filler pigment latex by mechanical stirring. This is the reverse of method I–(c) above (see I–(c) for examples of wax emulsion) and the stability of the filler latex should be augmented or adjusted prior to blending to avoid partial or total coagulation. Water may be added during or after blending to obtain the desired viscosity of the vinylic filler-wax emulsion composition. The emulsion composition can be used per se in some applications and may be dried to solid wax composition for other applications.

(III) Blending dispersed vinylic fillers and dispersed waxes or wax-resin compositions or solutions thereof (a) By mixing latices of vinylic fillers with wax solutions or wax-resin solutions or wax dispersions or wax-resin dispersions in an organic fluid; either may be blended into the other with or without the addition of additional emulsifier. It is preferred to add the wax dispersion (e.g., a petroleum ether solution of paraffin wax (20%), or a dispersion of 50 pts. of Carnauba Wax in a $C_1$ to $C_5$ alcohol and/or turpentine or other suitable solvent or solvent combination, to the latex while stirring. If additional emulsifier is desired, oleic acid may be dispersed in the wax solution or dispersion, and morpholine may be dissolved in the vinylic filler latex prior to blending the latex and wax dispersion or solution. If desired spray-drying of vinylic filler or vinylic filler pigment can be effected to give a dry vinylic filler or pigment which with water can be reconstituted into the latex form for use in the present invention.

(b) By mixing a dispersion (say 25% by wt.) of vinylic filler or pigment which with water can be recon-wax-resin dispersion in an organic solvent e.g., benzene or a wax solution in a solvent such as hexane. It was found that dispersing the dried (e.g. spray-dried) vinylic filler and/or vinylic pigment in an organic fluid such as benzene containing from 0.1 to 5% of a $C_1$ to $C_5$ alcohol, a 25% dispersion of the filler and/or pigment was obtainable in a transluscent form. This is readily blended into the wax or wax-resin dispersion or solution to give a composition (a) directly usable for some applications and (b) which may be evaporated at elevated temperatures to produce a filled reinforced wax. Also, the dried vinylic filler and/or pigments may be dispersed directly in the wax dispersion or wax-resin dispersion or wax or wax-resin solution with or without the addition of more organic fluid.

(c) By mixing a non-aqueous dispersion or solution of the wax or the wax-resin into a non-aqueous dispersion of the vinylic filler and/or vinylic pigment. This procedure is the reverse of III-(b) procedure and utilizes the same types of wax dispersions and solutions and vinylic filler dispersions as described in III–(b).

By the various incorporating methods heretofore described one obtains a dispersion of vinylic filler in wax or wax-resin compositions. The dispersion can be in the form of a dry mixture or an aqueous dispersion or emulsion, or a vinylic filler coated with wax or a wax composition.

Both the graft and non-grafted vinylic filler impart hardness to waxes and wax compositions and in many instances increase the strength thereof. Soft grafted vinylic fillers can increase the ductility of waxes and wax compositions. The polar vinylic fillers tend to bond the polar wax components, again increasing the strength of the waxes as well as hardening.

The new vinylic filler-wax compositions of this invention are thus products of improved hardness, strength, ductility; and such products can be used for the same applications in which waxes are employed without the addition of vinylic fillers, with advantage thereover.

Robert H. Mosher, in his books entitled, Specialty Papers" and "Technology of Coated and Processed Papers," the former published in 1950 and the latter in 1952 by Remsen Press, Brooklyn, N.Y., reviews the many applications of waxes in the paper coating industry. In a manner similar to the waxes the vinylic filler wax compositions can be used with added advantage that the mechanical physical properties of the waxes are upgraded without their inherent chemical physical particles, and the present research has shown that such colloidal sized particles, when suspended in a wax, aid in binding the wax together, thus strengthening it and hardening it without altering its wax-like characteristics.

In addition to paper-coating, waxes have many other uses such as in polishes, crayons, candles, etc. Albin Warth in his book entitled, "The Chemistry and Technology of Waxes," points out many of the uses of waxes. In a like manner H. Bennett, in his book entitled, "Commercial Waxes Natural and Synthetic," published in 1944 by Chemical Publishing Company, Inc., Brooklyn, N.Y., lists many of the waxes and indicates their uses with numerous formulations. The vinylic filler-wax composition can be used in a like manner. The heretofore cited literature sources are not intended to limit this invention, as the term vinylic filler-wax and vinylic filler wax-resin composition uses the word wax and wax-resin in its broadest sense.

Vinylic fillers can be used to harden natural and synthetic resins and these in turn can be used to harden waxes. For example, Pontianak Nubs, DBB Manila Nubs, Loba C. Manila Nubs, Processed Congo Gum, etc. can be emulsified into water, as for example by the method set forth in the article by Robert Allan, entitled, "Manila-Resins, the Use of Manila Copals in Bright Drying Floor Polishes," published December 1954 in Soap and Sanitary Chemicals. Vinylic filler latices can be added to water solutions, emulsions or suspensions of these natural resins, and other similar resins of natural or synthetic origin which disperse in water, and these combinations can be used as the resins are used, but with the advantages attendant on the inclusion of the hard insoluble colloidal particles in the composition.

(2) Modes of Preparing Vinylic Fillers

The exemplification of the vinylic fillers and graft vinylic fillers and vinylic filler pigments usable in the present invention is made by the specific polymerizations of Table II hereinafter. Further descriptions of types of monomers employable, alternate procedures of polymerization, and other details are not repeated herein as they have been fully described in aforesaid copending U.S. application Ser. No. 378,735 filed Sept. 8, 1958; U.S. application Ser. No. 538,728 filed Oct. 5, 1955 and U.S. application Ser. No. 462,611 filed Oct. 15, 1954 and the related issued patents as set out heretofore, and are incorporated herein by reference.

It was also found that vinylic fillers prepared utilizing polymeric emulsifying agents, were effective in the preparation of wax and wax-resin compositions. The polymeric emulsifiers used in preparation of vinylic fillers are of two classes: of natural origin and synthtetic origin. Thus Example 13 of my antioxidant U.S. application Ser. No. 462,611 incorporated herein by reference employs a vinylic filler graft formed from a hydrophilic polymer, vis: styrene-maleic acid polymer (ratio 47/53 based on maleic anhydride), and in connection with Example 13A thereof is similar in that the same polymeric emulsifier is used to prepare the graft-formed vinylic filler with the reference that the principle monomer used in forming the vinylic filler is vinyl acetate which is a very useful monomer for this purpose both from the sandpoint of availability and price.

Vinylic fillers of the graft vinylic type especially those graft-formed from hydrophilic polymers have, unexpectedly, unique physical properties and are useful in preparing the vinylic filler wax and wax-resin compositions hereof.

In preparing graft vinylic fillers from hydrophilic polymeric emulsifiers I prefer to employ 5 to 20% of such polymeric emulsifiers based on polymers used to form the graft vinylic fillers.

I have found that a variety of hydrophilic polymers can be employed for this purpose especially water-soluble or water dispersible polyelectrolytes. Hedrick and Mowry U.S. Pat. No. 2,625,529 relating to "Methods of Conditioning Soils" list a number of the water soluble polyelectrolytes and defines these materials as "synthetic water-soluble polyelectrolytes having a weight average molecular weight of at least about 1,000 and having a structure derived by the polymerization of at least one mo-olefinic compound through the aliphatic unsaturated group, and substantially free of cross-linking.

Using polyelectrolytes of the types listed by Hedrick and Mowry I have discovered that improved graft vinylic fillers can be formed by employing 0.001 to 50 percent preferably 0.02 to 20 percent based on the monomers used in the graft vinylic filler polymerization recipe. Thus, any water-soluble polyelectrolyte having a structure derived by the polymerization of at least one monoolefinic compound through the aliphatic unsaturated group may be used to form the cross-linked colloidal sized graft vinylic filler particles of this invention.

For brevity the water-soluble polyelectrolytes described in the aforesaid Hedrick and Mowry patent are included herein by reference. While Hedrick and Mowry for their purpose restricted their polyelectrolytes to those which are water-soluble I have discovered that I can used not only the water-soluble polyelectrolytes, but can also use the water-dispersible polyelectrolytes in forming graft vinylic fillers. By water dispersible I mean those polyelectrolytes which are not quite water soluble but will form water dispersions usually exhibiting the Tyndall effect. Thus when polyelectrolytes for use in the present invention are prepared from hydrophilic and hydrophobib polymerizable monomers, the latter monomers may even exceed the former in quantity so long as the ratio is such as to result in a water-soluble or water-dispersible polyelectrolytes.

Water-soluble and water-dispersible polyelectrolytes wet and disperse poorly the monomers used in the polymerization recipe to form graft vinylic fillers. I have discovered that if a surface-active agent or a soap (in amounts of about 0.02 to 0.5% based on monomers) is added together with the polyelectrolytes and the other components of the emulsion polymerization recipe used in preparing the graft vinylic filler lattices, then the monomers emulsify more easily, the polymerization proceeds better, and above all prefloc is greatly reduced or eliminated. The amount of surface-active agent or soap may be below the amount necessary to form micelles, that is, the amount of surface-active agent or soap (if it is capable of forming micelles) may be below the critical concentration for micelle formation. Thus, the purpose of the surface-active agent or soap in combination with a polyelectrolyte is merely to reduce the surface tension of the graft vinylic filler polymerization recipe.

Any surface-active agent or soap can be used provided such material does not interfere with the polymerization recipe. Of the many surface-active agents which may be used for this purpose I refer to the list on pages 126 through 131, entitled "Surface Active Agents" of Report No. 190, Second Series of the United States Tariff Commission entitled "Synthetic Organic Chemicals"—United States Production and Sales, 1952 available 1953 from U.S. Government Printing Office, Washington, D.C. Also I. J. Novak in his U.S. Pat. No. 2,626,213 issued Jan. 20, 1953, entitled "Asbestos Dispersions and Methods of Forming Same" has listed a number of typical surface-active agents any of which I have found may be used herein for lowering the surface tension of polyelectrolyte emulsions in which the monomers are polymerized to produce the vinylic fillers.

On the other hand where high-water resistance is desired in the vinylic filler-wax formulations or wax-resin formulations, it may be desired to use a vinylic filler latex having a minimum concentration of emulsifier, or none at all. In such applications the emulsifier can be omitted entirely from the formulations of Table I providing that from 1 to 5% of a water-soluble monomer be included in the recipe, e.g., acrylonitrile, acrolein, methacrylic acid, and the like. However, for good latex stability, it is preferred to include an amount of emulsifier up to the point of micelle formation (i.e., the critical concentration) or perhaps up to 0.5% of the emulsifier types herein discussed.

Table I illustrates typical recipes for a two step polymerization process for producing vinylic fillers suitable for incorporation with waxes or wax-resin mixtures.

TABLE I [1].—VINYLIC FILLERS FOR WAX EXAMPLES

| | Example No. | | | |
|---|---|---|---|---|
| | 9 | 10 | 11 | 12 |
| Vinylic filler latex, type, example | 1 | 2 | 3 | 4 |
| Polymerization step I (grams): | | | | |
| Styrene | 90 | 5 | 80 | 90 |
| Maleic anhydride | | 5 | | |
| Divinylbenzene [2] | 10 | | 10 | 10 |
| Methacrylic acid | | | 10 | |
| Polymerization recipe | ([3]) | ([4]) | ([5]) | ([5]) |
| Polymerization step II (grams): | | | | |
| Styrene | | 90 | | 10 |
| Divinylbenzene [2] | | 10 | | |
| Polymerization recipe | | ([6]) | | |
| Tetraethylenetetramine | | | | 0.5 |
| Cumenehydroperoxide | | | | 0.5 |
| Water | | | | 50 |
| Polymerization temp. °C | 60 | 60 | 60 | 60 |
| Polymerization time, hours | 12 | 12 | 12 | 6 |
| Polymerization yield: | | | | |
| Total solids, percent | 25.65 | 14.8 | 26.8 | 23.3 |

| | Example No. | | | | |
|---|---|---|---|---|---|
| | 13 | 14 | 15 | 16 | 17 |
| Vinylic filler latex type, example | 5 | 6 | 7 | 8 | 9 |
| Polymerization step I (grams): | | | | | |
| Styrene | 90 | 90 | 90 | 80 | 80 |
| Methacrylic acid | | | | 10 | 10 |
| Divinylbenzene [2] | 10 | 10 | 10 | 10 | 10 |
| Polymerization recipe | ([5]) | ([5]) | ([5]) | ([5]) | ([5]) |
| Polymerization step II (grams): | | | | | |
| Styrene | | 100 | | | |
| Vinylpyridine | | | | | 2.25 |
| Chloroethylacrylate | | | | 20 | |
| Methylmethacrylate | 10 | | | | |
| Ethylmethacrylate | | | 100 | | |
| Butadiene | | | | | 12.75 |
| Tetraethylenetetramine | 0.5 | | 0.4 | | |
| Cumenehydroperoxide | 0.5 | | 0.4 | | |
| Water | 50 | 50 | 300 | 100 | 100 |
| Azobis-(isobutyronitrile) | | 1.0 | | 0.5 | 0.1 |
| Polymerization temp. °C | 60 | 60 | 60 | 60 | 60 |
| Polymerization time, hrs | 6 | 5 | 5 | 12 | 12 |
| Polymerization yield: | | | | | |
| Total solids, percent | 24.85 | 36.6 | 25.0 | 20.45 | 23.4 |

[1] Same as Table XXVIII U.S. Application No. 538,728 filed October 5 1955 and Table XXXVIII of French Patent 1,163,886.
[2] Cross-linking agent.
[3] Recipe: 100 pts. monomers, 300 pts. water, 0.5 pts. potassium parsulfate, 0.25 pts. ammonium sufite, 10 pts. Santomerse-3 (sodium alkylaryl sulfonate of Monsanto Chemical Co.)
[4] Recipe: 100 pts. monomers, 500 pts. benzene, 2.4 pts. benzoyl peroxide, 1.5 pts. tert-dodecyl mercaptan, temp. 80°C., time 12 hrs. product filtered from benzene and dried.
[5] Recipe: 100 pts. monomers, 300 pts. water, 10 pts. Santomerse-3, 1 pt. diisopropylbenzene hydroperoxide, 0.21 pts. potassium pyro-phosphate, 0.19 pts. ferrous sulfate heptahydrate, 0.075 pts. t-dodecylmercaptan, 0.5 pt. potassium chloride, time 12 hrs., temp. 50° C., conversion 100%.
[6] Recipe: 10 pts. styrene-maleic anhydride copolymer recipe (2), 7.4 pts. 50% potassium hydroxide aqueous solution, 0.8 pts. Duponol ME (sodium lauryl sulfate of duPont Chem. Co.), 680 pts. water, 1.0 pts. ammonium persulfate, 0.5 pts. sodium sufite.
All parts in recipes ([3]) thru ([6]) are parts by weight.
*Same as Table XXVIII U.S. Application No. 538,728 filed Oct. 5, 1955 and Table XXXVIII of French Patent 1,163,886.
**Cross-linking agent.
[4] Recipe: 100 pts. monomers, 300 pts. water, 10 pts. Santomerse-3, 1 pt. diisopropylbenzene hydroperoxide, 0.21 pts. potassium pyro-phosphate, 0.19 pts. ferrous sulfate heptahydrate, 0.075 pts. t-dodecylmercaptan, 0.5 pt. potassium chloride, time 12 hrs., temp. 50° C., conversion 100% (parts means parts by weight.)

I have further found that vinylic fillers including graft vinylic fillers can be formed employing natural resins as emulsifiers especially with the aid of a small amount of surface tension reducing material (surfactant). Any of the natural resins capable of forming emulsions or solutions in water with the aid of alkali may be employed as all or part of the emulsifiers for preparing the vinylic fillers. Vinylic fillers produced with the aid of natural resins as dispersing agent are particularly suitable for blending with waxes and wax-resin compositions. Table II sets forth several typical examples of vinylic filler prepared in this manner. It will be appreciated by one skilled in the art taught by the examples hereof that other water dispersible or water soluble natural resins can likewise be employed in preparing vinylic fillers. Also the monomers may be selected from among those exemplified and setout in the aforementioned patent applications and patents concerning vinylic fillers and vinylic pigments.

TABLE II

|  | Example No. | | | |
|---|---|---|---|---|
|  | 18 | 19 | 20 | 21 |
| Natural resin: | | | | |
| Shellac, orange flake, g | 10 | | | |
| Manila Loba C, g | | 10 | | |
| Run Congo, g | | | 5 | |
| Phillipine Manila nubs, g | | | | 10 |
| Ingredients to solubilize resin: | | | | |
| Water, ml | 100 | 100 | | 100 |
| Sodium hydroxide, g | 3 | 1.8 | | |
| Potassium hydroxide, g | | | | 3.8 |
| Styrene, g | | | 80 | |
| Warm and shake | X | | | X |
| Filter | X | X | | |
| Other ingredients: | | | | |
| Water ml | 400 | 300 | 300 | 200 |
| Oleic acid [1], g | 2 | 2 | 1 | 2 |
| Alkyl aryl sulfonate [2], g | 1 | | | 1 |
| Fatty alcohol sulfonate [3], g | | 0.1 | 0.1 | |
| Sodium dioctyl sulfosuccinate [4], g | | | 0.1 | |
| Sodium hydroxide, g | | | 1.2 | |
| Filter | | X | | X |
| Monomers: | | | | |
| Styrene, g | 75 | 150 | | 175 |
| Divinylbenzene [5], g | 15 | 30 | 20 | 20 |
| Acrylonitrile, g | 10 | 20 | | 5 |
| Catalyst: | | | | |
| Potassium persulfate, g | 1.5 | 1.5 | 1.0 | 1.0 |
| Water for persulfate, ml | 35 | 37.5 | 25 | 35 |
| Sodium sulfite, g | 0.5 | 0.7 | 0.5 | 0.25 |
| Water for sulfite, ml | 15 | 14 | 10 | 15 |
| 1st polymerization conditions: | | | | |
| Temperature, °C | 60 | 60 | 60 | 60 |
| Time, hours | 1.75 | 3 | 8 | 1.25 |
| Conversion | | | 100 | |
| Further catalyst: | | | | |
| Cumene hydroperoxide, ml | 2 | 3 | | 1.5 |
| 2nd polymerization conditions: | | | | |
| Temperature, °C | 80 | 80 | | 60 |
| Time, hours | 10 | 10 | | 10 |
| Conversion, percent | 100 | 100 | | 100 |
| Latex pH | 4.5 | | | 10.6 |

[1] Emersol 233LL a trademark product of Emery Industries, Inc. Cincinnati, Ohio.
[2] Ultrawet 35KX (35% solids) a trademark product of the Atlantic Refining Co., Philadelphia, Pa.
[3] Dupanol ME a trademark product of E. I. du Pont de Nemours & Co. Wilmington, Del.
[4] Aerosol OT a trademark product of American Cyanamid Co., New York, N.Y.
[5] Divinylbenzene (50% DVB) produced by Dow Chemical Co., Midland, Michigan.

(3) Specific Examples Illustrative But Not Restrictive of the Invention

Example 22.—Graft vinylic filler-candelilla wax composition (Method I)

To 100 grams of candelilla wax melted and heated to 120° C. in an agitated open container was added the latex of Example 17 at a slow rate which permitted the water present in the latex to be boiled away. After all of the latex was added the temperature of the wax-vinylic filler composition was quickly raised to 140° C. and cooled.

The natural waxes such as the animal waxes like wool wax, spermacetic, etc., the plant waxes such as carnauba, ouricuri, sugar cane wax, etc., the fossil waxes, such as ozokerite, etc., the lignite waxes such as montan, ceresin wax, etc., the petroleum waxes such as paraffin, microcrystalline wax, etc., and the synthetic waxes can be processed as outlined by this Example 22 and the other examples to follow.

Example 23.—Vinylic filler-candelilla wax compound (Method I)

To the high speed mixer (Waring Blendor) heated with an electric heating mantle was added 200 grams of candelilla wax. The temperature of the melted wax was maintained at 150° C. while agitating and 200 grams acidic vinylic filler latex Example 11 (T.S.=26.8%) was slowly added from a dropping funnel. The moisture present in the latex was boiled away. In a commercial operation vacuum could be used to more rapidly remove the water vapors. The resulting compound contained about 20% of vinylic filler particles dispersed throughout the candelilla wax and was tougher, stronger and harder than the unfilled wax.

Example 24.—Vinylic filler-beeswax compound (Method II)

To the high speed mixer (Waring Blendor) jacketed with a heating mantle was added 200 grams of graft vinylic filler latex Example 10 and this latex was heated to 95° C. while agitating, then 5 ml. of 28% aqueous ammonia was added followed by 200 grams of melted yellow beeswax U.S.P. After stirring vigorously for 5 minutes, the beeswax-vinylic filler compound was poured into a tray to cool and then broken up and partially dried in warm air. The remaining moisture in the sample was removed by heating the beeswax-vinylic filler compound to 120° C. and agitating while residual water boiled off. The product showed improved ductility and hardness as compared with the untreated beeswax, and was less tacky.

In a like manner the natural and synthetic waxes can be combined with the graft vinylic fillers of this invention to yield new and valuable products.

Example 25.—Vinylic filler-ceresin wax compound (Method II)

To the high speed mixer (Waring Blendor) jacketed with a heating mantle was added 200 grams of vinylic filler latex from Example 9 (T.S.=25.65%) and this was heated to 95° C. and while agitating 3 ml. of 28% aqueous ammonia was added. Then 80 grams of yellow ceresin wax was melted and the molten wax added to the hot vinylic filler latex while agitating. The high speed agitation of the mixer easily emulsified the wax into the vinylic filler latex at the 95° C. temperature. The latex-wax emulsion was coagulated by adding 2 grams of aluminum chloride and 2 grams of calcium chloride dissolved in 50 ml. of water. (When the thickened wax-vinylic filler water suspension does not agitate well more water can be added.) The mix in thickened form was rapidly agitated for 5 minutes, then filtered and the filter cake washed. The resulting product was dried overnight in a draft drying oven at 65° C. Upon drying there was no separation of the wax and the dried product powdered easily.

The resulting wax-vinylic filler compound contains about 39% dispersed vinylic filler particles and such product can be blended with additional ceresin wax as set forth in Example 26.

EXAMPLE 26

To 100 grams of yellow ceresin wax melted and heated to 120° C. was added 100 grams of the wax-vinylic filler compound from the above Example 25. While stirring the temperature was raised to 150° C. and the wax-vinylic filler powder with stirring blended directly into the molten wax giving a smooth creamy mix. On cooling the product had improved strength, toughness and hardness when compared with the uncompounded yellow ceresin wax.

EXAMPLE 27

In a like manner as in Example 26, there was added 50 grams of melted yellow beeswax U.S.P. which was combined with 30 grams of the product of Example 25 and the temperature raised to 150° C. and the wax-vinylic filler compounds dispersed in the beeswax. The resulting product which contained 14.6% vinylic filler by weight, i.e., 1 part vinylic filler to 5.8 parts waxes had improved hardness and ductility when compared with the uncompounded beeswax.

In a like manner selected vinylic fillers may be combined with other waxes whether the natural mineral waxes (ozokerite), petroleum refining waxes (petroleum ceresin), or the lignite refining waxes (ceresin). It is understood that the methods of this example and the other wax-vinylic filler compounding examples herein can be applied to all natural and synthetic waxes, and that the dry vinylic filler wax dispersions, e.g. those produced in accordance with Examples 22–26, with the aid of cationic or anionic and/or non-ionic-emulsifiers can be converted into the form of water containing emulsions, e.g. aqueous dispersions, wherein, for example, the dispersed vinylic filler particles are coated with the wax materials. Other water dispersions can also be formed as per the following examples.

Example 28.—Vinylic filler latex-carnauba wax emulsion blend and dry product therefrom (Method III)

In the high speed mixer (Waring Blendor) jacketed with a heating mantle was added 200 ml. of water, 20 ml. of 23% aqueous ammonia and 6 ml. of morpholine and the mixture heated to 95° C. and while agitating there was added a melted combination of 100 grams carnauba wax, 25 grams stearic acid and 25 grams K wood rosin. While further agitating the wax emulsion was allowed to cool and an amber translucent carnauba wax emulsion resulted with 25% total solids.

A blend of 100 wt. parts of vinylic filler latex of Example 11 and 100 wt. parts (dry basis) of the above cited carnauba wax water emulsion were combined thus yielding an intimate aqueous dispersion of vinylic filler and carnauba wax. The resulting combination, while useful per se, was spray dried. In a like manner any of the vinylic filler latices set forth in Table II may be combined with aqueous wax emulsions and the dry products may be recovered therefrom.

While the above given blending ratios have been found to give very hard finishes, this invention further comprises the blending of the various vinylic filler, graft vinylic filler and vinylic pigment latices exemplified herein and in my U.S. patent applications Ser. No. 378,735 and No. 462,611, in the desired ratio with wax emulsions in the broadest sense, and further this invention includes the combining of vinylic filler latices and wax and resin emulsions and the dry products from all these combinations.

TABLE III

|  | Example No. | | | |
| --- | --- | --- | --- | --- |
|  | 29 | 30 | 31 | 32 |
| Latex type example, grams | −2 | −2 | −2 | −3 |
| Latex quantity | 100 | 100 | 100 | 100 |
| Additional water | 100 | 100 | 100 | 100 |
| Blendor mixing temp., ° C | 90 | 90 | 90 | 90 |
| Wax type (melted) (grams): | | | | |
| Montan Wax (M.P. 80–86° C.) | 60 | | | |
| Microcrystalline wax [1] | | 80 | | |
| Oxidized microcrystalline wax [2] | | | 60 | |
| Paraffin wax (M.P. 125–130° F.) | | | | 50 |
| 10% sodium hydroxide solution | 5 | 5 | 5 | 5 |
| Additional water | 300 | 300 | 200 | 200 |
| Coagulants [3] (ml.): | | | | |
| 10% barium chloride solution | 30 | | | |
| 10% magnesium chloride solution | | 50 | | |
| 10% calcium chloride solution | | | 50 | 50 |

|  | Example No. | | | | |
| --- | --- | --- | --- | --- | --- |
|  | 33 | 34 | 35 | 36 | 37 |
| Latex type example, grams | −6 | −7 | −8 | −9 | −4 |
| Latex quantity | 100 | 100 | 100 | 50 | 100 |
| Additional water | 300 | 100 | 100 | 50 | |
| Blendor mixing temp., ° C | 90 | 90 | 90 | 90 | 90 |
| Wax type (melted) (grams): | | | | | |
| Sugar cane wax [4] | 40 | | | | |
| Japan wax | | 60 | | | |
| Yellow beeswax | | | 70 | | |
| Spermaceti | | | | 30 | |
| Shellac | | | | | 30 |
| 10% sodium hydroxide solution | | | | | 5 |
| 28% aqueous ammonia | | | 5 | | |
| Additional water | 200 | 200 | 100 | 300 | 10 |
| Coagulants [3] (ml.): | | | | | |
| 1.5% sulfuric acid solution | 25 | 25 | | 25 | 25 |
| 20% sodiumchloride solution | 20 | 10 | | 8 | |
| 10% aluminum chloride solution | | | 30 | | |

[1] Cerese Wax AA, Socony Vacuum Oil Co.
[2] Crown Wax Co. No. 33, Petrolite Corp., New York City.
[3] After adding coagulant, all samples were agitated vigorously for 5 minutes then filtered and dried 24 hours in forced draft oven at 60–70° C.
[4] Sugar cane wax Type 500 Warwick Wax Co., Inc., Chanute, Kans.
NOTE.—All examples were prepared in the high speed stirrer (Waring Blendor) with electric heating jacket.

Examples 29–37.—Various vinylic fillers with various waxes

Examples 29 thru 37 are set forth herein to exemplify the breadth of the invention and are not to be considered restrictive of the invention. It is important that sufficient wax be combined with a vinylic filler so that when the combination is dried the dry product can either be used as is or can be used in combinations with organic diluents, e.g. for aerosol sprays.

It is common in the wax consuming industry to combine various waxes and to combine waxes and resins to achieve the desired blend of properties. It is important to understand that similar mixtures can be used in the vinylic filler-wax combinations because the vinylic fillers are discrete insoluble particles that harden and strengthen the continuum.

Thus one skilled in the art can appreciate the fact that this invention provides for the hardening and strengthening of waxes without detracting from their wax-like properties.

Example 38

This example illustrates the combination of vinylic fillers and natural and/or synthetic resins with waxes in the form of aqueous dispersions. C. L. Mantell in his book entitled, "The Technology of Natural Resins," published in 1942 by John Wiley and Sons, New York City, describes in Chapter XXIII methods of preparation of emulsions and water dispersions of natural resins or their combinations with stearic acid, asphalts, pitches, and the like. Such dispersions and emulsions I have found can be combined with waxes and vinylic fillers as is illustrated in this example.

A clear amber solution of Manila Loba C can be prepared by adding 250 ml. of water to the high speed mixer and heating this water to 50° C. then adding 5 ml. of 28% aqueous ammonia, 5 grams of triethanolamine and 5 grams of morpholine followed by 50 grams of powdered Manila Loba C and after agitating for 10 minutes a clear solution results. This solution is then blended with equal parts of a vinylic filler latex from Example 17 Table II and the resulting vinylic filler-resin blend was further combined with 50 grams (dry basis) of the carnauba wax emulsion of Example 28 to yield a vinylic filler-wax-resin blend suitable as a polish for automobiles, furniture, etc.

Example 39

Alternately in place of the vinylic filler latex employed in Example 38 in combination with an emulsion of Manila Loba C resin and carnauba wax, one can employ in place of the vinylic filler of this example any of the vinylic pigment latices or the washed vinylic pigment filter cakes as set forth in Tables III to XI of my copending U.S. application 462,611 filed Oct. 15, 1954 or from Table III to XI of my French Pat. No. 1,135,872. The fillers from these aqueous wax-resin-vinylic pigment combinations are translucent in nature and if a metal tint is desired then 5 grams of aluminum powder wet with 0.5 gram of linseed or tung oil and the like can be combined with 100 grams of the aqueous dispersion of vinylic pigment-wax-resin combination. Such combinations yield metal tinted color wax finishes which can be used applied to metals or painted metals as automobile finish or to any object where such polishable finishes are desired.

Example 40.—Vinylic filler in silicon compositions

Vinylic fillers in combination with silicone fluids can be used to prepare polishes for automobiles, furniture, floors, household appliances, etc. The vinylic fillers are used as hardening additives to the silicone containing coatings and polishes including those with and without waxes as part of the composition and including those of the solvent dispersion type or the aqueous emulsion type as set forth in Table IV formulae A and B.

Table IV illustrates the application of vinylic fillers to the production of polishes and protective coatings containing silicones.

TABLE IV.—VINYLIC FILLERS WITH SILICONES

| Polish ingredients | Polish formula type | |
| --- | --- | --- |
| | A, percent | B, percent |
| Vinylic filler (dry basis) | 1-15 | 1-12 |
| Silicone fluid | 1-4 | 1-4 |
| Emulsifying agent | 1-3 | 1-3 |
| Wax blend | 0-8 | 2-12 |
| Abrasive | 0-15 | |
| Solvent | 20-40 | (¹) |
| Water | (¹) | |
| Polish application | (²) | (³) |

¹ Remainder.
² Auto.
³ Floor and furniture.

Two types of formulation are illustrated in the above Table IV; type A represents aqueous emulsion polishes, and may be further characterized as containing wax. Likewise similar formulations of the solvent type B are made with and without waxes. It is understood that one skilled in the art of formulating waxes and polishes based on the teaching of these examples will realize the numerous combinations which can be made. The formulations presented in Table IV are not limiting or restrictive as to composition, but are illustrative only.

The vinylic fillers which can be used in the Formulae A and B of Table IV with silicone and silicone wax combinations are included the non-grafted types and the grafted types and the vinylic filler pigment types as set forth in my copending U.S. patent application and the patents cited heretofore.

The silicone fluids are employable in Formulae A and B of Table IV include for example, Dow Corning 200 fluids described in the Dow Corning Silicone Notebook issued June 1952, the General Electric Company G.E. SF-92 series silicone fluids described in the General Electric Silicones Application Data sheets, AD-15A, dated Jan. 1, 1953, and AD-15D dated Dec. 1, 1952, and the "Linde" silicone oils L-45, described in Linde Air Products Company, Linde data sheet entitled "Silicone Oil L-45" issued Jan. 15, 1953 and other silicone fluids can likewise be employed.

Typical emulsifying and wetting agents of various types can be employed both of the ionic and non-ionic types such as the sulfated long chain alcohols, sulfonated amides and esters, mixed alkylaryl sulfonate-esters of fatty acids, petroleum sulfonates and the ethylene condensation products with phenol, etc. I have found these emulsifiers including the natural resin emulsifiers have no adverse effects on the effectiveness of vinylic fillers in this silicone applications, therefore, the type of emulsifier is not critical so long as it does not cause excessive water absorption of the resulting film and where low water absorption is desired, I have found the fluorinated emulsifiers are useful as for example ammonium perfluoro-caprylate has been successfully used as emulsifier for the silicones in Table IV.

Thus vinylic fillers are useful with typical wax blends may consist of the natural hard waxes such as carnauba, candelilla, Montan, ouricury or cane waxes and/or the soft natural waxes such as beeswax and/or the petroleum products such as the paraffins, ceresins, petrolatums or mineral oils and/or the oxidized paraffins and microcrystalline waxes, and/or the synthetic waxes such as the ester and amide waxes and/or hydrogenated castor oil waxes.

Typical abrasives which may be employed with these vinylic filler wax and wax-resin blends such as bentonite, diatomaceous earth, amorphous silica, silicone dioxide produced by burning silicone tetrachloride, or produced by removal of the metallic ion from metal silicates, chalk, tripoli clay and the like.

Typical solvents such as kerosene, Stoddard solvent, mineral spirits, naphtha, turpentine, amyl acetate, 2-ethyl hexanol, gasoline, methyl ethyl ketone and the like may be used in these formulations.

EPILOG

Thus by the present invention, new vinylic filler-wax or wax-resin compositions and/or vinylic filler pigment-wax or wax-resin compositions are provided for improved reinforced polishes for various applications, for paper finishing, for textile finishing, for adhesive compositions, and for many other applications in which wax and wax-resin formulations are useful.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invetnion, the scope of which is defined in the appended claims, and that all modifications that come within the meaning and range of equivalency of the claims are intended to be included therein.

I claim:

1. A composition having wax-like properties and consisting essentially of the combination of
   (a) sufficient wax composition to form a continuum, and
   (b) sufficient vinylic filler material to harden said continuum,
   (c) said continuum forming wax composition consisting essentially of from 5% to 100% by weight of wax selected from group (1) and from 0 to 95% by weight of resin compatible with the selected wax and selected from group (2),
   (d) said group (1) consisting of the waxes which are unctuous, fusible (i.e. meltable) viscous liquid to solid substances having a characteristic waxy luster, of natural or synthetic origin, and
   (e) said group (2) consisting of the natural and synthetic resins which are meltable and soluble and compatible with one or more of said waxes and which are themselves resinous as distinguished from elastomeric materials, and
   (f) said vinylic filler material being made up essentially of rigid polymer particles in the colloidal size range; said rigid particles being three-dimensionally cross-linked so that each particle is non-meltable and non-soluble; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them rigid and non-soluble as aforesaid, said vinylic filler material being substantially uniformly dispersed throughout said continuum-forming wax composition and constituting from about 1% to about 78% by weight of the combination thereof with the wax composition.

2. A composition as claimed in claim 1, wherein the vinylic filler material constitutes from 5% to 50% by weight of the combination thereof with the wax composition.

3. A composition as claimed in claim 1, wherein said wax-composition is selected from the waxes and combinations thereof.

4. A composition as claimed in claim 1, wherein said wax composition is a wax-resin composition.

5. A composition as claimed in claim 1, 2, 3 or 4 in the form of an aqueous dispersion.

References Cited

UNITED STATES PATENTS

| | | | |
|---|---|---|---|
| 1,979,946 | 11/1934 | Krauch et al. | 260—28.5(B) |
| 2,415,541 | 2/1947 | Soday | 260—33.6(AO) |
| 2,547,605 | 4/1951 | Signer et al. | 260—28.5(B) |
| 2,614,093 | 10/1952 | Wheelock | 260—892 |
| 2,643,987 | 6/1953 | Harrison et al. | 260—41.5 |
| 2,695,277 | 11/1954 | Pabst et al. | 260—28.5 |
| 2,923,692 | 2/1960 | Ackerman et al. | 260—28.5 |

FOREIGN PATENTS

| | | | |
|---|---|---|---|
| 1,135,872 | 5/1957 | France (I) | 260—37 |
| 1,144,575 | 10/1957 | France (II) | 260—37 |
| 1,163,886 | 10/1958 | France (III) | 260—37 |
| 799,043 | 7/1958 | Great Britain | 260—37 |

OTHER REFERENCES

Warth, "The Chemistry and Technology of Waxes," Reinhold Publishing Corp., New York, 1947, pages 409–411.

ALLEN LIEBERMAN, Primary Examiner

U.S. Cl. X.R.

106—272; 260—29.6